United States Patent [19]
Bilanin et al.

[11] Patent Number: 5,092,169
[45] Date of Patent: Mar. 3, 1992

[54] AIRCRAFT SAFETY MEASUREMENT SYSTEM

[75] Inventors: Alan J. Bilanin, Princeton; Andrew E. Kaufman, Robbinsville, both of N.J.

[73] Assignee: Continuum Dynamics, Inc., Princeton, N.J.

[21] Appl. No.: 569,129

[22] Filed: Aug. 17, 1990

[51] Int. Cl.$^5$ .................. G01C 21/00; G01W 1/14
[52] U.S. Cl. .................. 73/178 R; 73/29.01; 73/171
[58] Field of Search ........... 73/178 R, 178 H, 178 T, 73/29.01, 29.05, 171, 147, 170 R

[56] References Cited

U.S. PATENT DOCUMENTS

| | | | |
|---|---|---|---|
| 3,446,069 | 5/1969 | Zink | 73/171 |
| 3,830,103 | 8/1974 | Andrjkovics et al. | 73/170 R |
| 3,861,212 | 1/1975 | Henry | 73/171 |
| 3,905,236 | 9/1975 | Henry | 73/171 |
| 3,986,110 | 10/1976 | Overall | 73/304 C |
| 4,031,753 | 6/1977 | Hooper | 73/29.01 |
| 4,154,089 | 5/1979 | Carlos | 73/29.01 |
| 4,446,721 | 5/1984 | Bruce et al. | 73/29.01 |
| 4,765,187 | 8/1988 | Weinstein | 73/304 R |

*Primary Examiner*—Donald O. Woodiel
*Attorney, Agent, or Firm*—Salzman & Levy

[57] ABSTRACT

The present invention features a technique and system for achieving sufficiently stable, thick liquid films on an aircraft surface during a rain storm in flight, wherein such stable and thick films can be measured to determine liquid water content (LWC) in the air, and (by known correlation) rain fall rate. Rainfall impinging upon an airflow surface of an aircraft, such as a wing portion, is gathered and confined within a weir-like structure. The flow of the rain is constricted within this device to increase the film thickness and reduce shear between air and liquid boundaries, whereby a stable film surface for measurement is provided.

18 Claims, 5 Drawing Sheets

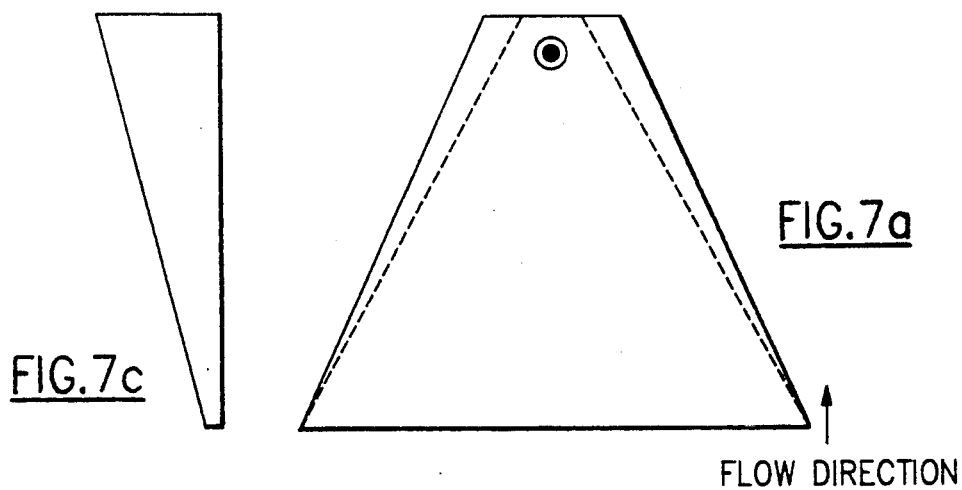
FIG.7a
FIG.7c
FIG.7b
FLOW DIRECTION
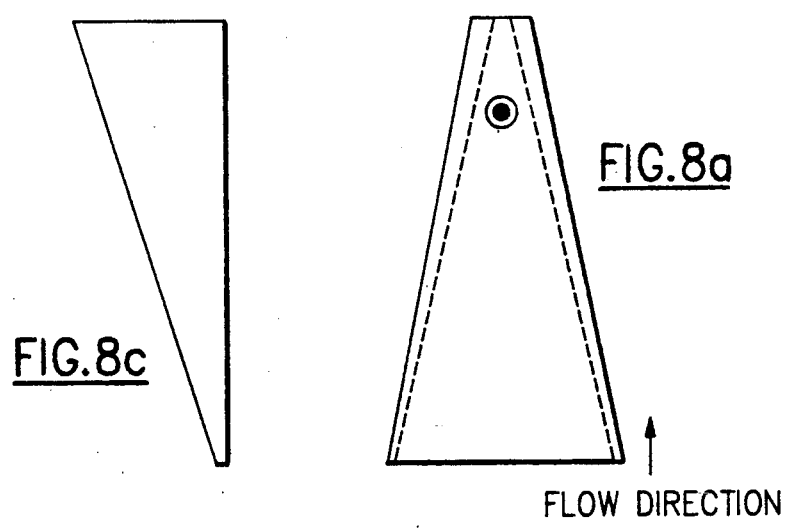
FIG.8a
FIG.8c
FLOW DIRECTION
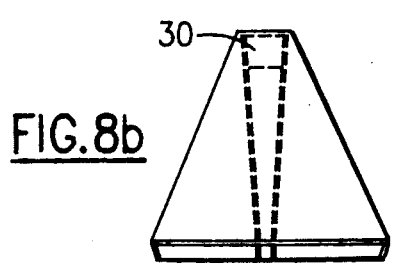
FIG.8b

AIRCRAFT SAFETY MEASUREMENT SYSTEM

SBIR RIGHTS NOTICE

The present invention has been developed under government Contract No. NAS1-18819 in conjunction with the National Aeronautics and Space Administration, Langley Research Center, Hampton, Va. 23665. The government may have rights in this invention.

FIELD OF THE INVENTION

The invention features a system and method for measuring rain conditions of aircraft in flight, and more particularly to a system and method of determining dangerous rain conditions for airborne vehicles by the measurement of dynamic liquid build-up on airframe surfaces.

BACKGROUND OF THE INVENTION

For many years, pilots have avoided flying through storms and turbulent weather areas. It was common knowledge that many unpredictable and dangerous flight conditions were to be experienced in bad weather.

More recently, there has been mounting concern with the effects upon airborne vehicles resulting from wind-shears and heavy rain conditions. Recent tests by NASA have confirmed that aircraft performance is severely compromised during heavy rains. Unfortunately, very little scientific information is currently available with respect to the effects produced by heavy downpours. Part of this dearth of scientific data is attributable to the lack of instrumentation and methodologies for measuring rain and atmospheric water content during flight.

Simple rain gathering equipment and rain gauge apparatuses for static rain measurement are totally inadequate for this purpose. High speed jet planes have complex aerodynamic surfaces that do not lend themselves to simple rain gathering techniques. Rain generally approaches these surfaces at speeds that present lateral (head-on) droplet introduction to airfoil structures. Liquids flowing over these surfaces form turbulent rivulet streams. These rivulet streams are constantly shifting, making measurement of their substance difficult. At any particular point in time, a surface can be alternately bathed in, or void of, liquid. Surface tension, frictional surface effects, air flow, and a host of other dynamic factors and parameters make the entire measurement problem extremely complex.

It is generally believed that the most dangerous heavy rain condition is presented at low altitudes, and this would obviously effect the aircraft at the worst time, i.e. during landings and take-offs. At these critical times, the airborne vehicle is travelling at approximately 200 miles per hour. Even at these slower speeds, rain conditions are not readily simulated in wind tunnel experiments, because of the difficulty of testing a full scale aircraft in a wind tunnel. Prior studies by the inventors have shown that sub-scale testing is not always accurate because of competing scale effects.

Rainfall rate can be directly correlated to liquid water content (LWC) measurement. High LWC (heavy rain) induced performance degradation is a serious safety hazard. LWC is defined as the mass of liquid water per unit volume of air, and is a measure of rain at altitude.

Although high LWC induced performance degradation is a serious safety hazard, the present state of the art cannot determine the precise period of time, magnitude, and/or at what altitude high LWC presents a dangerous condition. Until this invention, the instrumentation has not been developed to make these tests.

What makes the present invention truly unique, is the fact that the method and system developed to measure LWC is very simple in concept, despite the complexity of the problem. It has been discovered that there is a correlation between LWC and rainfall rate.

The invention described herein eliminates the two major stumbling blocks to measurement of water film thickness, i.e., (1) film instability, and (2) thinness of the film.

As is presently known, air flowing over the water film on the surface of an airborne vehicle causes interfacial instabilities with widely fluctuating film thicknesses. Airfoil surface imperfections and the interfacial instabilities also cause the water film to become discontinuous. Therefore, direct liquid film measurement is all but impossible. Sensors upon a wing of an aircraft, for example, will often experience a dry condition during periods of high LWC.

The invention solves the problem by providing a method and apparatus for building a thick and continuous film layer upon an airfoil surface during flight. The thick and continuous film is sufficiently thick and stable to provide an accurate film measurement by standard sensing devices, such as conductance, capacitive, resistive, optical, and mechanical depth sensors, etc.

DISCUSSION OF RELATED ART

In U.S. Pat. No. 3,986,110; issued to Overall et al on Oct. 12, 1976, a water depth measuring device is shown for determining the depth of liquid accumulating upon an airport runway. Other such airport runway rain measuring systems can also be found in the U.S. Pat. Nos. 3,861,212, issued Jan. 21, 1975 and 3,905,236, issued Sept. 16, 1975.

The measuring systems illustrated in the aforementioned patents are for static rain conditions, and have no capability to determine dynamic rain accumulations.

In U.S. Pat. No. 3,830,103, issued to Andrjkovics et al on Aug. 20, 1974, a rain impact gauge is shown for determining the frequency and force of raindrops impinging upon a projectile as it travels through a rain field. The measuring device of this patent senses the shock waves induced by the impacting raindrops upon the missile surface, and converts the sensed shock into an electrical signal that is transmitted to a ground station.

A rain gauge for airborne vehicles is depicted in U.S. Pat. No. 3,446,069, issued to Zink on May 27, 1969. This patent suggests that exact changes in rain rate can be determined at the nose of an aircraft entering and leaving a rain area. The gauge comprises a cone that is mounted to the aircraft nose. An accelerometer crystal detector is mounted inside the cone wall for measuring the impinging raindrops upon the outside surface. The resonances of the impingements are converted to a capacitive change.

A liquid thickness gauge is illustrated in U.S. Pat. No. 4,765,187, issued to Weinstein on Aug. 23, 1988. The thickness of a liquid is measured on a surface independently of the water conductivity. The device consists of two pairs of spaced-apart wires mounted on a rain bearing surface. The resistance change between each of the wire pairs is measured, and the ratio between the two measurements is indicative of the liquid thickness.

The above-identified patent does not provide a solution to the problem that is solved by the present invention, viz. how to measure either very thin or unstable, constantly fluctuating liquid rivulets upon an airfoil surface traveling through an airstream.

SUMMARY OF THE INVENTION

In accordance with the present invention, there is provided a technique and system for achieving sufficiently stable, thick liquid films on an aircraft surface during a rain storm in flight, wherein such stable and thick films can be measured to determine liquid water contact (LWC) in the air. It has been discovered by this inventor, that LWC is directly correlated to rainfall rate.

Rainfall impinging upon a surface of an aircraft, such as a wing portion, is gathered and confined within a weir-like structure. The flow of the rain is constricted within this device to increase the film thickness and provide a stable film surface for measurement. In addition the weir device is covered with a shield so that incoming rain is not permitted to impact the accumulated liquid and result in cratering, splashing, and hence, unsteadiness in the accumulated liquid.

The device consists of a weir-like structure that has an inlet at the front portion for capturing the liquid film and air passing over the aircraft surface. Within the device, the air decelerates thereby reducing the shear stress between the air and water film, which in turn reduces the water film speed, $U_f$. The reduction of the water film speed in conjunction with the narrowing of the liquid flow passage causes the water film to stabilize and increase in height as the water proceeds toward the rear portion of the device. The water and air both exit through the outlet at the rear portion of the device.

A sensing device is disposed at the rear portion of the structure to sense and measure the film thickness. This measurement is used to calculate the liquid water content (LWC) in the air. As aforementioned, LWC is defined as the mass of liquid water per unit volume of air. The LWC is then used to determine the rain conditions surrounding the aircraft.

The sensing device comprises a sensor and a circuit for measuring the film thickness of the liquid. The measurement is then fed to a processor. The aircraft air speed may have to be fed to the processor, because film thickness has been shown to be weakly dependent on air speed. This can be accomplished with an additional air speed sensor or by using the output from the air speed sensors currently on the aircraft. However, since most commercial aircraft takeoff and land at similar speeds it may be possible to compensate for the air speed effect without additional sensor input. The resulting digital signal representative of liquid film thickness measurement is processed to provide LWC and rainfall condition information. Many different sensors can be used within the scope of this invention, such as: conductivity, capacitive, resistive, and optical sensors.

BRIEF DESCRIPTION OF THE DRAWINGS

A complete understanding of the present invention may be obtained by reference to the accompanying drawings, when considered in conjunction with the following detailed description, in which:

FIGS. 7a, 7b, and 7c illustrate top, front and side views, respectively, of a first alternate embodiment designated configuration "A", of a film measuring device shown for the invention of FIG. 1;

FIGS. 8a, 8b, and 8c illustrate top, front and side views, respectively, of a second alternate embodiment designated configuration "B", of a film measuring device shown for the invention of FIG. 1.

DESCRIPTION OF THE PREFERRED EMBODIMENT

Generally speaking, the invention features a liquid film measuring system and method for determining the Liquid Water Content (LWC) in the air surrounding an aircraft in flight. It has been determined that the LWC correlates with the rainfall rates to which the aircraft is subjected. The method and system of the invention provides a way to stabilize and increase the liquid film thickness of rain flowing over an aircraft surface, in order to make an accurate measurement.

For purposes of clarity and brevity, like elements and components will bear the same designations throughout the figures.

Figure 1:
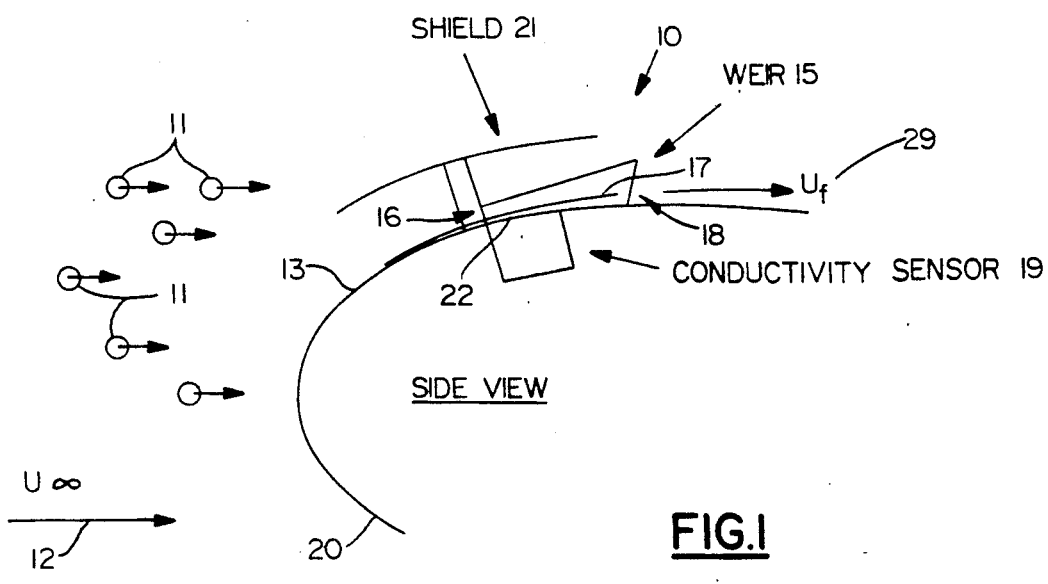
FIG. 1 illustrates a schematic side view of one embodiment of a liquid film measuring device in accordance with this invention, shown in situ.
Figure 2:
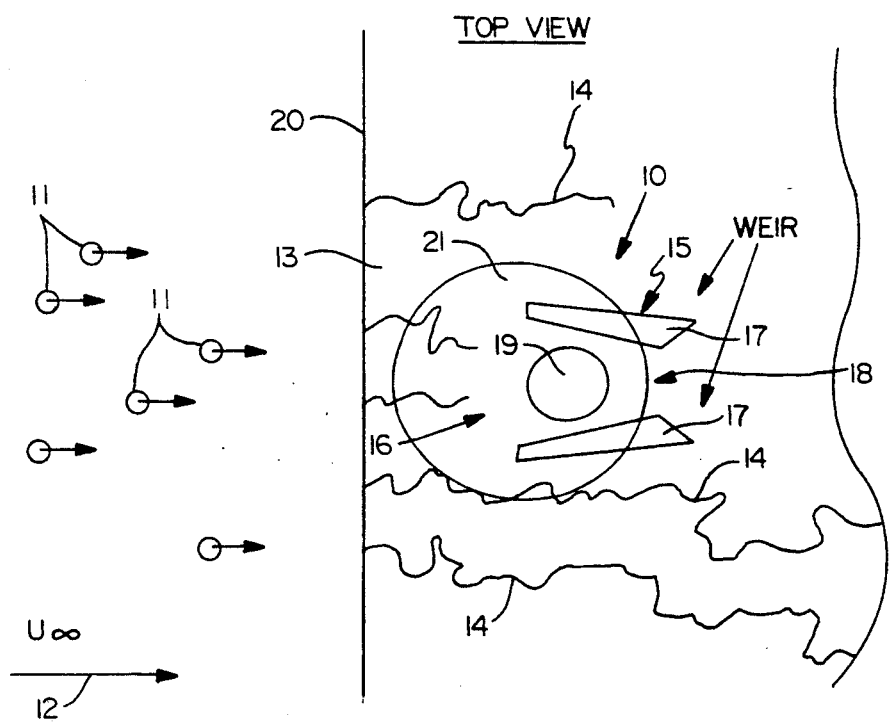
FIG. 2 depicts a top view of the measuring device shown in FIG. 1.

Now referring to FIGS. 1 and 2, schematic side and top views of a liquid film measuring device 10, are shown. Water droplets 11 are directed (arrow 12) towards an aircraft airfoil 20, such as a wing. As the droplets 11 impinge and collect upon the aircraft surface 13, they form unstable rivulet streams 14, as shown in FIG. 2 (top view).

The liquid film measuring device 10, includes a weir 15 that gathers in the air and liquid that enters the inlet 16, defined by the side walls 17, the aircraft surface and the shield 21. The gathered air and liquid is caused to accumulate within the weir as it travels toward the rear of the weir, before being discharged at the outlet 18. The narrowing constriction of the side walls 17 causes the entering liquid to form a stabilized film 22 of increased thickness. The increasing area of the weir towards the exit slows the air, causing a reduction in shear. In this manner, further stability and thickness is provided to the liquid film. Furthermore, viscous effects slow the air and provide still a greater stability and thickness. As the rainfall or LWC varies, the thickness of film 22 will correspondingly increase or decrease. Such a stabilized, thick film 22 is capable of being measured by any one of a number of conventional sensors, well known in the art.

A sensing device 19 disposed between the two side walls 17, measures the thickness of the liquid film 22. The sensor device 19 could form the wall 17 or be attached to wall 17, or the shield 21 depending upon the particular sensor configuration. This thickness measurement is then converted into a liquid water content measurement (LWC), as will be explained, hereinafter. Film thickness measurements can be made continuously, or on an incremental basis. Several readings may be taken and then averaged to improve the accuracy of the reading.

A shield 21 disposed over the weir 15, prevents rain drops 11 from impinging upon the stabilized film 22. Such impingement would be disruptive to the stability of film 22, causing inaccuracies in its sensing and measurement by the sensing device 19.

The air and water flowing out of the weir device 19, is the same as that flowing into the weir device 19.

Figure 3:
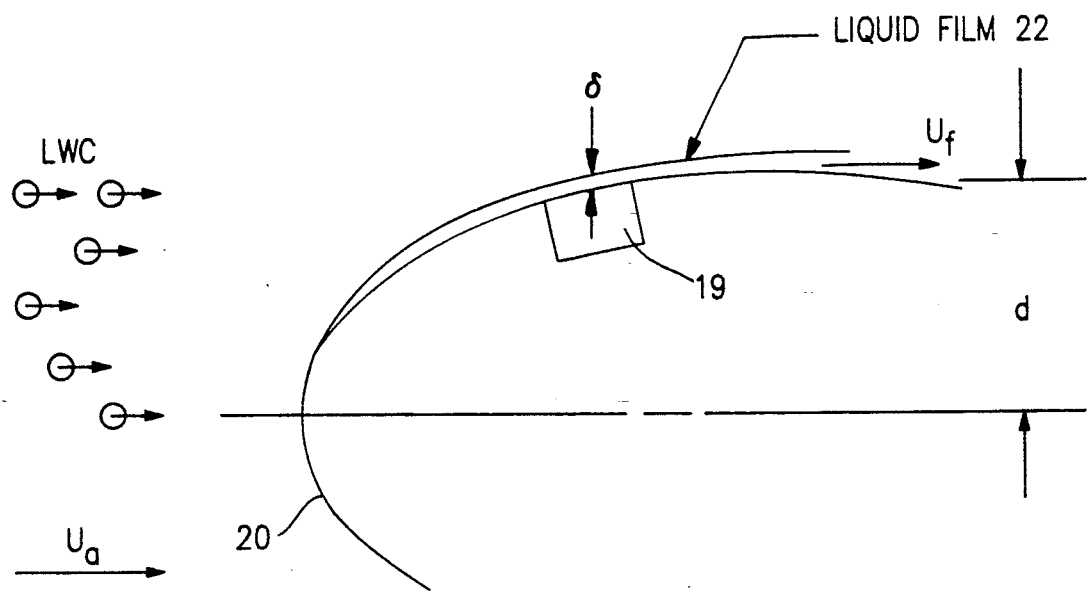
FIG. 3 is a schematic diagram used to relate liquid flow rate to LWC.

Referring to FIG. 3, a schematic diagram is illustrated for calculating the liquid water content (LWC) of the air, using the measurement device of FIGS. 1 and 2.

The mass flow rate of the water per unit width over an aircraft surface is given by the following equation:

$$\dot{m} = \beta LWC \cdot U_a \cdot d \quad (1)$$

where: d is the height of the collection area shown in FIG. 3 and $\beta$ is the collection efficiency. This mass flow must equal the mass flow rate of the film, given by following equation:

$$\dot{m} = \rho U_f \delta \quad (2)$$

where: $U_f$ is the water film velocity, $\rho$ is the density of the liquid, and $\delta$ is the water film thickness.

From equations (1) and (2), it can be shown that LWC is proportional to the thickness of film 22.

Figure 4:
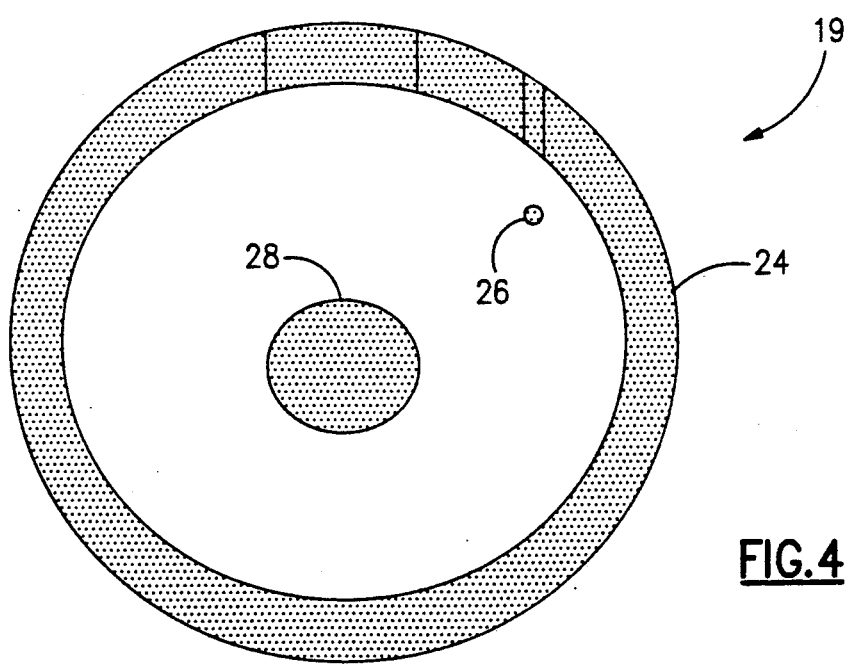
FIG. 4 is a top view schematic diagram of one embodiment of a film thickness sensor in accordance with the liquid film measuring device of the invention shown in FIG. 1.

Referring now also to FIG. 4, there is shown one example of a sensing device 19 that operates on the same principle as the conductivity sensor shown in the aforementioned U.S. Pat. No. 4,765,187, whose teachings are incorporated herein by way of reference.

Sensing device 19 comprises an outer, annular ring electrode 24, and two round electrodes 26 and 28, respectively. The annular ring electrode 24 is at ground potential and the two round electrodes 26 and 28 provide two separate measurements of AC resistance. An AC voltage is used to minimize polarization and electrolysis effects. The sensing device 19, also provides automatic compensation for temperature and composition changes due to pollution, acid rain, salt, etc.

The resistance of the liquid film depends upon the resistivity of the liquid and the cross-sectional area of the effective current flow path. The current flow in the water film 22 is due to ion migration, and is limited by either the wetted area of the electrodes or the film thickness. This accounts for the difference in the resistance measured by the two electrodes 26 and 28. The ion migration for the large electrode 28 is limited by the film thickness, while the small electrode 26 has its measurement limited by its wetted area.

Since the film resistance measured by electrode 26 depends upon the conductivity of film 22, while the resistance of electrode 28 depends upon both the conductivity and thickness of film 22, the ratio of the two electrode measurements provides a measurement of film thickness.

The conductivity sensing device 19 used herein, is only one of many sensing devices that can be used with this invention, and is only illustrated herein, as a teaching of a preferred embodiment. Other sensing devices 19 can include, but is not limited to: capacitive sensors, resistive sensors, optical sensors, etc.

Figure 5:
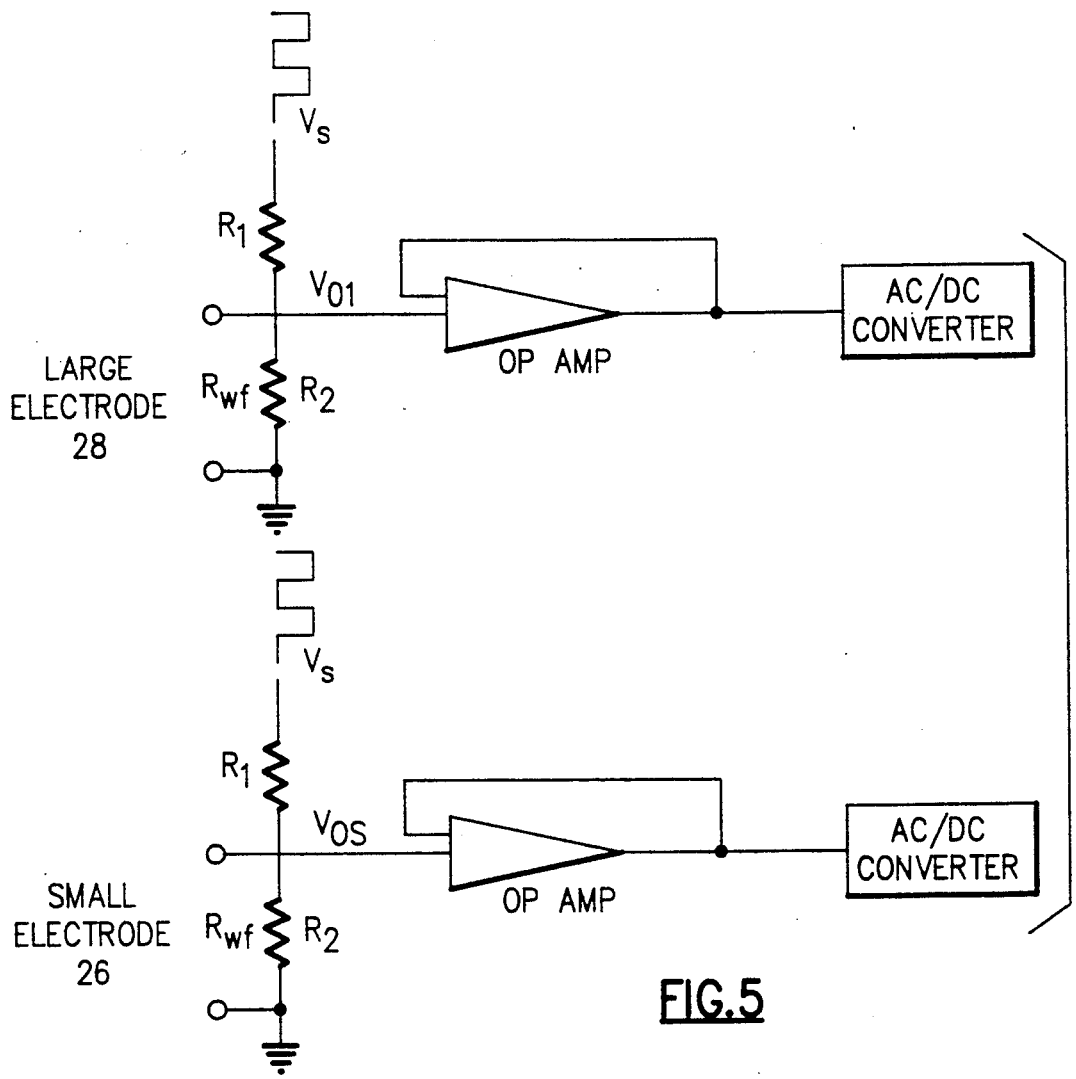
FIG. 5 is a partial electrical schematic diagram of a circuit used in conjunction with the thickness sensor shown in FIG. 4.

Referring to FIG. 5, typical circuitry is shown for each of the electrodes 26 and 28, respectively.

The film resistance, $R_{wf}$, is proportional to the voltage at the sensor plus a circuit constant, as given below:

$$\frac{1}{V_o} = \frac{1}{R_{wf}[R_1/R_2]} + R_1 + \frac{R_1}{R_2 V_s} \quad (3)$$

where: $R_1$ and $R_2$ are resistances shown in the circuit of FIG. 5, and $V_s$ is the supply voltage. The constant in equation (3) is equal to the inverse of the sensor voltage when the sensor is dry, as given below:

$$\frac{1}{V_{oDRY}} = R_2 + \frac{R_1}{R_2 V_s} \quad (4)$$

Then the function $\phi$, defined below, is proportional to the film thickness (inversely proportional to film resistance) over the operational range of the sensor:

$$\phi = \frac{1}{V_o} - \frac{1}{V_{oDRY}} = \frac{R_1}{V_s} \cdot \frac{1}{R_{wf}} \quad (5)$$

Taking the ratio of the function defined by equation (5) for the electrodes 26 and 28, respectively, yields a result that is proportional to film thickness:

$$\phi_l / \phi_s \; \alpha \; \text{Film thickness} \quad (6)$$

Figure 6:
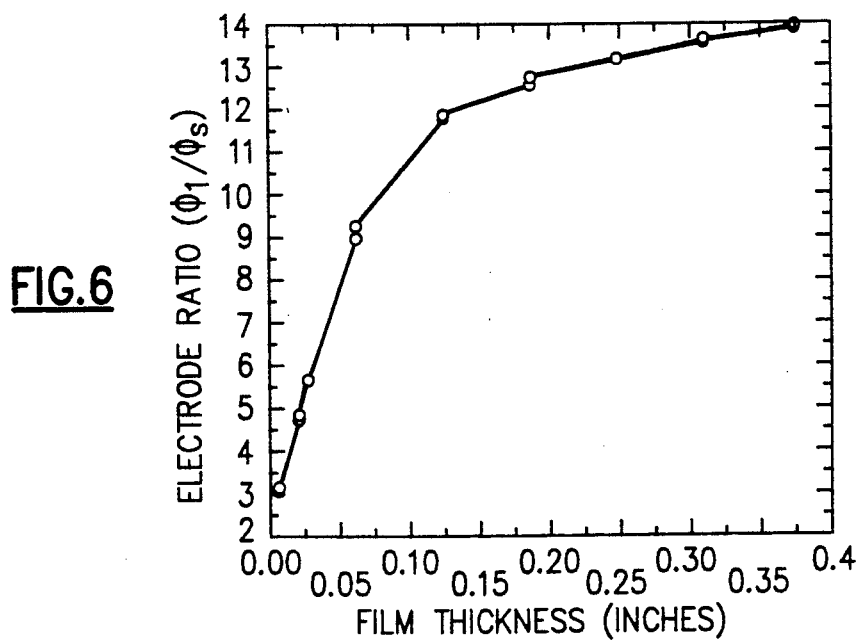
FIG. 6 depicts a graph relating film thickness to the electrode ratio for the sensor illustrated in FIG. 4.

Referring to FIG. 6, a graph of film thickness is plotted against the ratio obtained in equation (6).

Referring to FIGS. 7a, 7b, and 7c, top, front and side views are respectively shown for a weir 15 design having the designation "A". Tests were conducted with this design, and with the design of weir 15, designated "B", illustrated in the top, front and side views of respective FIGS. 8a, 8b, and 8c. Note that in FIG. 8c a plate 30 was added to the outlet of the device in order to reduce the airflow exit area, which improved the performance of the weir design. A flat, control test plate (not shown) was also used in the test, whose results are given in table I, below. The tests were conducted at two different dynamic pressures, corresponding to aircraft velocities of 50 and 70 knots. LWC was varied from 40 to 10 g/m³, which is equivalent to rain rates of 40 to 10 inches/hour.

TABLE I

ELECTRODE RATIOS AND FILM THICKNESS CONFIGURATION

| Velocity (kts) | LWC g/m3 | Flat Plate $\phi$ ratio | Flat Plate thickness (in) | A $\phi$ ratio | A thickness (in) | B $\phi$ ratio | B thickness (in) |
|---|---|---|---|---|---|---|---|
| 70 | 40 | 4.49 | .021 | 11.7 | .118 | 13.2 | .250 |
| 70 | 20 | 4.28 | .019 | 10.5 | .088 | 12.6 | .184 |
| 70 | 10 | 4.07 | .016 | 8.3 | .055 | 11.9 | .125 |
| 50 | 40 | 4.55 | .022 | 12.4 | .167 | 13.7 | .313 |
| 50 | 20 | 4.44 | .021 | 11.7 | .118 | 12.6 | .184 |
| 50 | 10 | 3.37 | .012 | 9.7 | .075 | 11.6 | .113 |

Figure 9A:
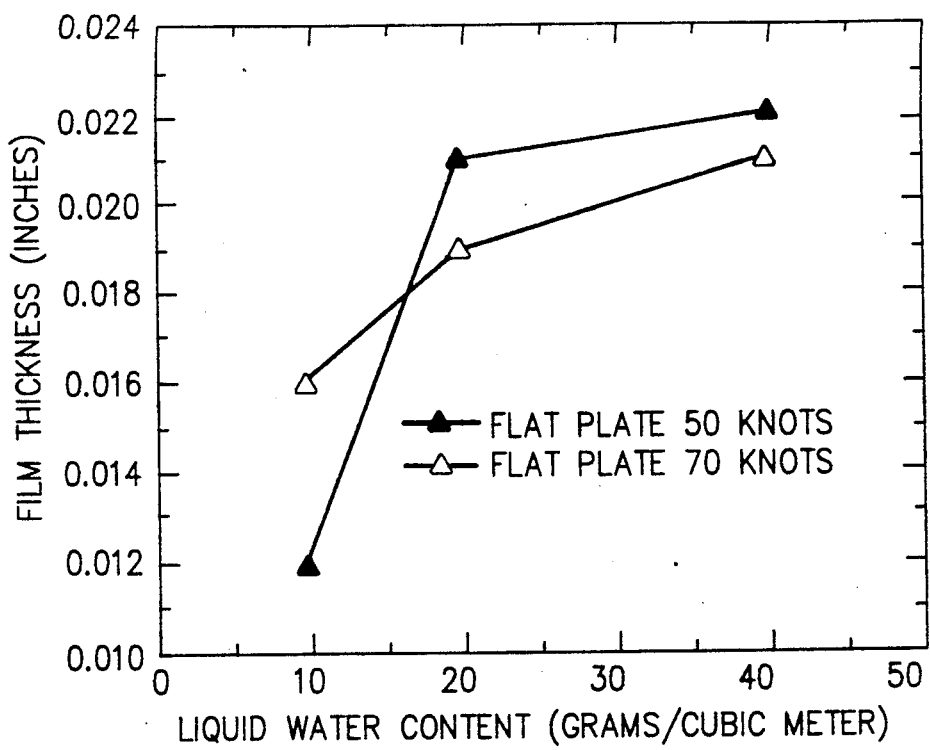
FIGS. 9a and 9b depict two graphs, respectively, showing film thickness versus Liquid Water Content at various aircraft velocities.
Figure 9B:
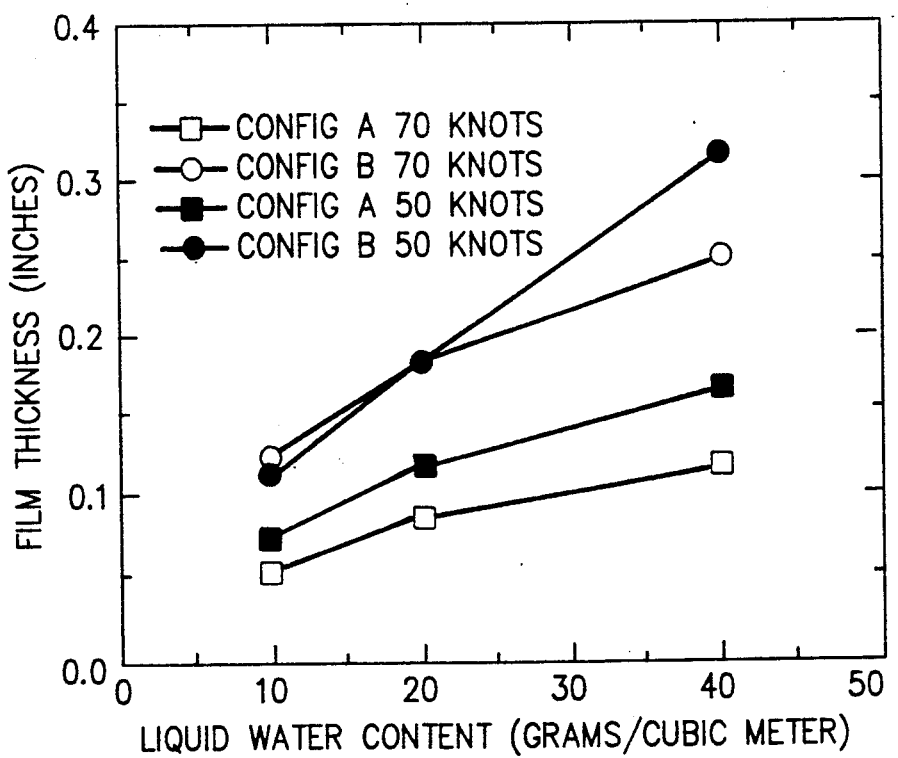

Referring to FIGS. 9a and 9b, plots of the film thickness versus LWC is shown for the two aircraft velocities of 50 and 70 knots. FIG. 9a features the graph for the control flat plate, and FIG. 9b illustrates the graph for both configurations "A" and "B", respectively.

The graphs indicate that film thickness is a monotonic function of LWC. The weir designs indicate that this type of device increases the film thickness an order of magnitude over the flat plate control. Film thickness is also shown to be a weak function of aircraft velocity. The data clearly demonstrates that the use of the weir 15 and the shield 21 eliminates the instabilities present in the film when using just a flat plate. Standard deviation of film thickness measurement is an order of magnitude smaller with the use of the weir.

The above test results clearly indicate that LWC can be determined using stabilized liquid film measurements obtained with the various weir designs of this invention.

An IBM PC can be operatively connected to the A/D converters shown in the circuit diagram of FIG. 5, in order to record the measurements.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A method of determining rain conditions for aircraft during flight as a function of liquid water content in the air (LWC), said LWC being determined by measurement of a liquid film flowing over an airflow surface of said aircraft, said method comprising the steps of:
   a) gathering rain impinging upon an airflow surface of an aircraft during flight;
   b) confining the gathered rain within a sensing area of said airflow surface, to build-up a measurable liquid film thickness that is both stable and sufficiently thick for determining liquid water content (LWC);
   c) sensing and measuring said liquid film thickness of said gathered and confined rain to determine said liquid water content (LWC); and
   d) correlating the determined liquid water content (LWC) to rain conditions experienced by said aircraft during flight.

2. The method of determining rain conditions for aircraft during flight in accordance with claim 1, wherein said confining step (b) includes the further step of:
   e) allowing both rain and air to flow into a sensing compartment, whereby a stable liquid film will be caused to build in height as a function of both a reduction in shear between air and said liquid film and narrowing of a liquid flow passage within said sensing compartment.

3. The method of determining rain conditions for aircraft during flight in accordance with claim 1, wherein said sensing and measuring step (c) is performed substantially continuously.

4. The method of determining rain conditions for aircraft during flight in accordance with claim 3, wherein measurement of said film thickness in accordance with step (c) is substantially continuously averaged.

5. The method of determining rain conditions for aircraft during flight in accordance with claim 1, wherein said confining step (b) further includes the step of:
   e) discharging said gathered rain from an outlet of said sensing area at a flow rate substantially the same as a flow rate at an inlet of said sensing area.

6. The method of determining rain conditions for aircraft during flight in accordance with claim 1, wherein said correlating step (d), further comprises the step of:
   e) measuring air speed of said aircraft.

7. The method of determining rain conditions for aircraft during flight in accordance with claim 6, wherein the measuring of air speed in step (e) is performed substantially continuously.

8. An apparatus for determining rain conditions for an aircraft during flight as a function of liquid water content in the air (LWC), characterized by sensing and measuring a film thickness of rain impinging upon, and flowing over, an airflow surface of said aircraft, comprising:
   a rain gathering device having a slowing air and liquid flow configuration disposed upon an airflow surface of an aircraft, said rain gathering device including means for reducing shear between air and liquid entering and flowing over said airflow surface, and providing a build-up in height of a stable, sufficiently thick liquid film by virtue of said slowing air and liquid flow configuration; and
   a liquid film sensing and measuring means disposed adjacent said rain gathering device for measuring the built-up liquid film height during flight of said aircraft, whereby measurement of said stable and sufficiently thick liquid film provides a determination of liquid water content (LWC).

9. The apparatus of claim s, wherein said rain gathering device further comprises means for allowing both rain and air to flow into, and out of, a sensing area at a substantially uniform flow rate, whereby a stable liquid film will be caused to build in height as a function of both a reduction in shear between air and said liquid film and a narrowing of a liquid flow passage within said sensing area.

10. The apparatus of claim 8, further comprising a shield disposed adjacent to said rain gathering device.

11. The apparatus of claim 8, wherein said rain gathering device comprises a weir-like structure having a liquid inlet and a liquid outlet and further defined by a shield, an airfoil surface, and two walls that narrow in distance therebetween from said liquid inlet to said liquid outlet.

12. The apparatus of claim 11, wherein the sensing and measuring means is disposed adjacent said liquid outlet of said rain gathering device.

13. The apparatus of claim 12, wherein the sensing and measuring means is disposed away from said wall.

14. The apparatus of claim 11, wherein said sensing and measuring means is disposed away from said wall at said liquid outlet of said rain gathering device.

15. The apparatus of claim 11, wherein at least one wall of said weir-like structure expands in area from said liquid inlet to said liquid outlet.

16. The apparatus of claim 8, further comprising a processor operatively connected to said sensing and measuring means for converting the liquid film measurement to liquid water content (LWC) information.

17. The apparatus of claim 16, further comprising means operatively connected to said processor for supplying air speed information thereto, in order for said processor to provide said liquid water content (LWC) information.

18. A method of determining rain conditions for aircraft during flight as a function of liquid water content in the air (LWC), said LWC being determined by measurement of a liquid film flowing over an airflow surface of said aircraft, said method comprising the steps of:
  a) constricting rain flowing over an airflow surface of an aircraft within a sensing area of said airflow surface, to build-up a measurable film thickness that is both stable and sufficiently thick for determining liquid water content (LWC); and
  b) sensing and measuring said film thickness of said constricted rain flow to determine said liquid water content (LWC).

* * * * *